United States Patent
Lee et al.

(10) Patent No.: US 11,541,400 B2
(45) Date of Patent: Jan. 3, 2023

(54) ELECTROSTATIC PRECIPITATING APPARATUS AND COOLING TOWER HAVING SAME

(71) Applicant: Doosan Enerbility Co., Ltd., Changwon-si (KR)

(72) Inventors: Jin Woon Lee, Gimhae-si (KR); Sang Rin Lee, Changwon-si (KR); Jae Dong Hwang, Gunsan-si (KR); Sang Chul Moon, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 260 days.

(21) Appl. No.: 16/856,172

(22) Filed: Apr. 23, 2020

(65) Prior Publication Data
US 2020/0360935 A1  Nov. 19, 2020

(30) Foreign Application Priority Data

May 14, 2019 (KR) .................. 10-2019-0056573
Jul. 2, 2019 (KR) .................. 10-2019-0079676

(51) Int. Cl.
  *B03C 3/14*   (2006.01)
  *B03C 3/08*   (2006.01)
  (Continued)

(52) U.S. Cl.
  CPC ............... *B03C 3/014* (2013.01); *B03C 3/08* (2013.01); *B03C 3/41* (2013.01); *B03C 3/47* (2013.01);
  (Continued)

(58) Field of Classification Search
  CPC combination set(s) only.
  See application file for complete search history.

(56) References Cited

U.S. PATENT DOCUMENTS 2,542,262 A * 2/1951 Richardson ............... B03C 3/86
                                                    96/86
4,502,872 A * 3/1985 Ivester .................... B03C 3/41
                                                    96/90
(Continued)

FOREIGN PATENT DOCUMENTS

CN   103816771 A   5/2014
CN   107110607 A   8/2017
(Continued)

OTHER PUBLICATIONS

CN OA dated Mar. 21, 2022.

*Primary Examiner* — Christopher P Jones
*Assistant Examiner* — Sonji Turner
(74) *Attorney, Agent, or Firm* — Harvest IP Law LLP

(57) ABSTRACT

An electrostatic precipitating apparatus for a cooling tower is provided. The precipitating apparatus include an electrostatic precipitator including a plurality of discharge electrodes to which a voltage is applied and a plurality of electrostatic precipitating electrodes each disposed between the discharge electrodes and grounded, a washing water supply spraying the washing water to the electrostatic precipitator, and a frame assembly supporting the electrostatic precipitator. The electrostatic precipitator includes a first setting beam having a plurality of lower slots into which the discharge electrodes are fixedly inserted, and the frame assembly includes a lower frame extending in a stacking direction of the discharge electrodes to support the first setting beam, via which a voltage is applied to the discharge electrode.

15 Claims, 18 Drawing Sheets

(51) Int. Cl.
  *B03C 3/41* (2006.01)
  *B03C 3/47* (2006.01)
  *B03C 3/86* (2006.01)
  *B03C 3/78* (2006.01)
  *B03C 3/014* (2006.01)
  *F28F 25/00* (2006.01)

(52) U.S. Cl.
  CPC ............... *B03C 3/78* (2013.01); *B03C 3/86* (2013.01); *F28F 25/00* (2013.01); *F28F 2025/005* (2013.01)

(56) References Cited

U.S. PATENT DOCUMENTS

| | | | |
|---|---|---|---|
| 8,814,995 B2* | 8/2014 | Johansson | B03C 3/70 96/92 |
| 11,198,136 B2* | 12/2021 | Moon | B03C 3/86 |
| 11,260,401 B2* | 3/2022 | Moon | B01D 53/78 |
| 2014/0260987 A1* | 9/2014 | Park | F28C 1/16 96/53 |
| 2014/0305044 A1 | 10/2014 | Zhang et al. | |

FOREIGN PATENT DOCUMENTS

| | | | |
|---|---|---|---|
| CN | 207102901 U | | 3/2018 |
| JP | 2000-107637 A | | 4/2000 |
| JP | 2009-034599 A | | 2/2009 |
| JP | 2009-095799 A | | 5/2009 |
| JP | 2012-205974 A | | 10/2012 |
| JP | 2012205974 A | * | 10/2012 |
| KR | 10-0688945 B1 | | 3/2007 |
| KR | 10-2010-0091734 A | | 8/2010 |
| KR | 10-2014-0148287 A | | 12/2014 |
| KR | 10-1657971 B1 | | 9/2016 |
| KR | 10-2017-0076944 A | | 7/2017 |
| KR | 10-1949984 B1 | | 4/2019 |

* cited by examiner

ELECTROSTATIC PRECIPITATING APPARATUS AND COOLING TOWER HAVING SAME

CROSS REFERENCE TO RELATED APPLICATION(S)

The present application claims priority to Korean Patent Application Nos. 10-2019-0056573 and 10-2019-0079676, filed on May 14, 2019 and Jul. 2, 2019, respectively, the entire contents of which are incorporated herein for all purposes by this reference.

FIELD

The present disclosure relates to an electrostatic precipitating apparatus for removing dust and moisture and a cooling tower having the same.

BACKGROUND

Generally, industrial heat exchangers in air conditioning units, refrigeration equipment, etc., produce waste heat, which can be discharged to the atmosphere, via a cooling tower, using a cooling medium in order to improve heat exchange efficiency. The cooling method of a cooling tower is divided into air-cooled cooling that performs convection cooling by forced convection of atmospheric air having a lower temperature than the fluid to be cooled, and evaporative cooling that uses the latent heat of evaporation by contact of cooling water and air. Among them, cooling towers having an evaporative cooling system are widely used because they provide greater cooling performance and economical advantage than any other cooling system.

Conventional cooling towers can be categorized into two types: a counterflow type cooling tower in which air flows vertically upward and coolant flows vertically downward; and a cross flow type cooling tower in which air flows substantially horizontally and the cooling water flows vertically downward. A flowing method of cooling water is divided into an open type in which evaporative heat exchange is carried out by allowing cooling water and air to flow through an exposed filler, and a closed-type in which evaporative heat exchange is carried out by allowing cooling water and air to come into contact with the surface of a closed cooling coil through which cooling fluid (e.g., cooling water and coolant) flows.

These cooling towers emit saturated humid air, which causes a problem of generating white (colored) smoke. Such white smoke is produced when hot saturated humid air discharged from the cooling tower collides with the relatively cold external air, so as to be cooled below the dew point to form supersaturated water vapor. The formation of white smoke occurs mainly in cold weather in which the warm discharge air is mixed with the air in the cold atmosphere. Although the white smoke is pure water vapor and is not an air pollutant, if a cooling tower is located in or near a residential area, people may mistake such white smoke as industrial pollution and file civil complaints. Furthermore, this white smoke may disrupt the appearance of the streets, may cause condensation to form on windows of nearby structures during the winter season, and may cause moisture to accumulate on roads near or adjacent to the cooling tower.

Also, since conventional cooling towers discharge the used air without purification, it is necessary to develop some technology capable of removing possible debris or fine dust from the water vapor output from the cooling tower.

BRIEF DESCRIPTION

An objective of the present disclosure is to provide an electrostatic precipitating apparatus capable of removing fine droplets and dust, and a cooling tower having the same on the basis of the technical background as described above.

In an aspect of the present disclosure, there is provided an electrostatic precipitating apparatus for a cooling tower, the electrostatic precipitating apparatus including: an electrostatic precipitator including a plurality of discharge electrodes to which a voltage is applied, a plurality of electrostatic precipitating electrodes each disposed between the discharge electrodes and grounded, and a first setting beam having a plurality of lower slots into which the discharge electrodes are fixedly inserted; a washing water supply spraying the washing water to the electrostatic precipitator; and a frame assembly supporting the electrostatic precipitator, the frame assembly including a lower frame extending in a stacking direction of the discharge electrodes to support the first setting beam, via which a voltage is applied to the discharge electrodes.

The frame assembly may further include a lower insulating connector member having a lower insulator and a terminal rod penetrating through the lower insulator, wherein the lower frame is provided so as to be suspended from the insulating connector member. The frame assembly may further include a tubular girder fixed to a wall surface of the housing and into which the plurality of the insulating connector members is inserted, wherein the lower insulator is held inside the tubular girder.

A purge air supply pipe may be connected to the tubular girder to supply purge air into the tubular girder therethrough, wherein the tubular girder is provided on a lower side thereof with a discharge hole, through which the purge air is discharged, wherein the lower insulator extends downward through the discharge hole.

The insulating connector member may be provided on a lower side thereof with a vent hole through which air is jetted downward, wherein the terminal rod extends downward through the vent hole, wherein an anchor is disposed on the terminal rod to support the lower frame, to which a voltage is applied via the terminal rod.

A first reinforcing rod may be disposed on the discharge electrode to extend from opposite sides of the discharge electrode in a width direction of the discharge electrode such that the first reinforcing rod is supported by the first setting beam, wherein the first setting beam include a lower beam and an upper beam coupled to the lower beam, wherein the lower beam has a bottom portion and two side walls bent from opposite side ends of the bottom portion and protruding upward, and wherein the lower slots are formed only on the side walls.

The electrostatic precipitating apparatus may further include a prestressing locking member fixed to the inside of the housing in a state in which a pressing force is applied to the electrostatic precipitator.

The prestressing locking member may include a casing, an insulator disposed in the casing, a pressing rod coupled to the insulator so as to protrude downward, and a pressing support provided to the pressing rod to resiliently support the electrostatic precipitator.

A bottom surface of the electrostatic precipitating electrode may be provided with a lowest portion disposed below the other portion so that the washing water is collected at the lowest portion, wherein a discharge guide having a channel is disposed directly below the lowest portion so that the washing water flowing down from the electrostatic precipitating electrode is accommodated in the channel.

The discharge guide may extend in the stacking direction of the electrostatic precipitating electrodes.

A lower part of the electrostatic precipitating electrode may be provided with a fixing hole, through which a fixing rod is inserted, wherein a support hanger is coupled to the fixing rod to support the discharge guide, wherein the support hanger includes a plurality of connection protrusions protruding upward and into which the lower part of the electrostatic precipitating electrode is inserted, wherein the connection protrusion is provided with a support hole into which the fixing rod is inserted.

In another aspect, there is provided an electrostatic precipitating apparatus for a cooling tower, the apparatus including: an electrostatic precipitator including a plurality of discharge electrodes to which a voltage is applied and a plurality of electrostatic precipitating electrodes each disposed between the discharge electrodes and grounded; a washing water supply spraying the washing water to the electrostatic precipitator; and a frame assembly supporting the electrostatic precipitator, the frame assembly including a prestressing locking member fixed to the inside of a housing in a state in which a pressing force is applied to the electrostatic precipitator.

In a further aspect, there is provided a cooling tower including: a housing having a gas inlet and a gas outlet: a heat exchanger disposed adjacent to the gas inlet; a water sprayer configured to spray cooling water to the heat exchanger; an electrostatic precipitator including a plurality of discharge electrodes to which a voltage is applied and a plurality of electrostatic precipitating electrodes each disposed between the discharge electrodes and grounded; and a washing water supply configured to spray washing water to the electrostatic precipitator.

The housing may be provided with an electrostatic precipitating space protruding upward from the housing, wherein an electrostatic precipitator is disposed in the electrostatic precipitating space.

A solar panel may be attached to an outer wall of the housing to produce electricity using solar light.

The cooling tower may further include a first setting beam having a plurality of lower slots into which the discharge electrodes are fixedly inserted, and a lower frame extending in a stacking direction of the discharge electrodes to support the first setting beam, via which a voltage is applied to the discharge electrode.

The cooling tower may further include a lower insulating connector member having a lower insulator and a terminal rod penetrating through the lower insulator, wherein the lower frame is provided so as to be suspended from the insulating connector member. The cooling tower may further include a prestressing locking member fixed to the inside of the housing in a state in which a pressing force is applied to the electrostatic precipitator.

A bottom surface of the electrostatic precipitating electrode may be provided with a lowest portion disposed below the other portion so that the washing water is collected at the lowest portion, wherein a discharge guide having a channel is disposed directly below the lowest portion so that the washing water flowing down from the electrostatic precipitating electrode is accommodated in the channel.

The discharge guide may extend in the stacking direction of the electrostatic precipitating electrodes.

A lower part of the electrostatic precipitating electrode may be provided with a fixing hole, through which a fixing rod is inserted, wherein a support hanger is coupled to the fixing rod to support the discharge guide, wherein the support hanger includes a plurality of connection protrusions protruding upward and into which the lower part of the electrostatic precipitating electrode is inserted, wherein the connection protrusion is provided with a support hole into which the fixing rod is inserted.

As described above, according to an embodiment of the present disclosure, since the electrostatic precipitating apparatus is installed inside the cooling tower, fine droplets and dust may be efficiently removed. In addition, since the electrostatic precipitator is disposed above the heat exchanger, fine droplets and dust may be efficiently removed.

DETAILED DESCRIPTION

Figure 1:
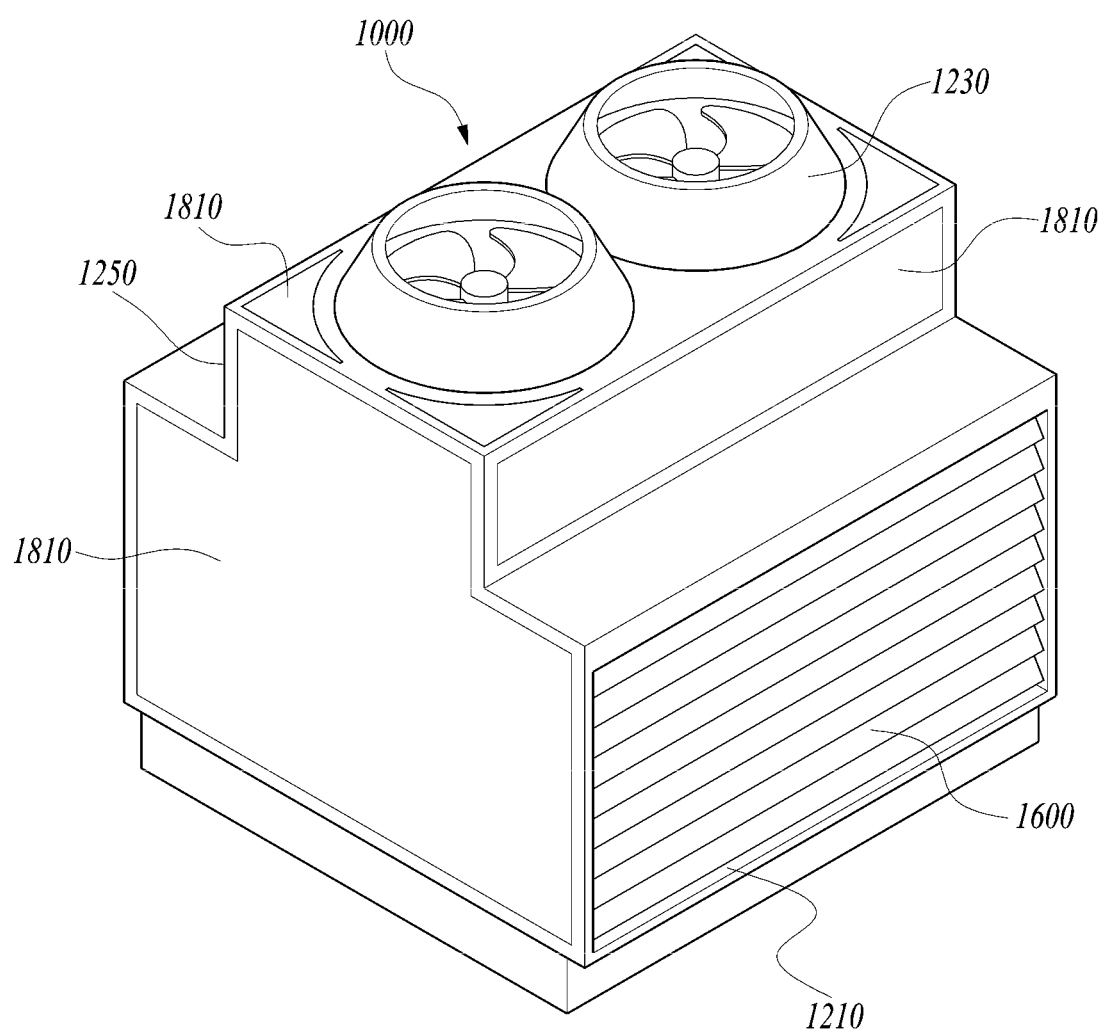
FIG. 1 is a view illustrating a cooling tower according to a first embodiment of the present disclosure.

As the present disclosure allows for various changes and numerous embodiments, particular embodiments will be illustrated and described in detail in the detailed description. However, it should be understood that this is not intended to limit the present disclosure to the specific embodiments, but may include all transformations, equivalents, and substitutes included in the concepts and scope of the present disclosure.

The terminology used herein is for the purpose of describing particular embodiments only and is not intended to be limiting the present disclosure. Singular expressions include plural expressions unless the context clearly indicates otherwise. It will be further understood that the terms "comprises" and/or "comprising," or "includes" and/or "including," when used in this specification, specify the presence of stated features, numbers, steps, operations, elements, components, or a combination thereof, but do not preclude the presence or addition of one or more other features, numbers, steps, operations, elements, components, or a combination thereof.

Reference will now be made in greater detail to a preferred embodiment of the present disclosure, an example of which is illustrated in the accompanying drawings. Wherever possible, the same reference numerals will be used throughout the drawings and the description to refer to the same or like parts. In the following description, it is to be noted that, when the functions of conventional elements and the detailed description of elements related with the present disclosure may make the gist of the present disclosure unclear, a detailed description of those elements will be omitted. Similarly, some elements shown in the drawings may be exaggeratedly or schematically drawn or omitted to make the present disclosure easy to understand.

Hereinbelow, a cooling tower according to a first embodiment will be described.

Figure 2:
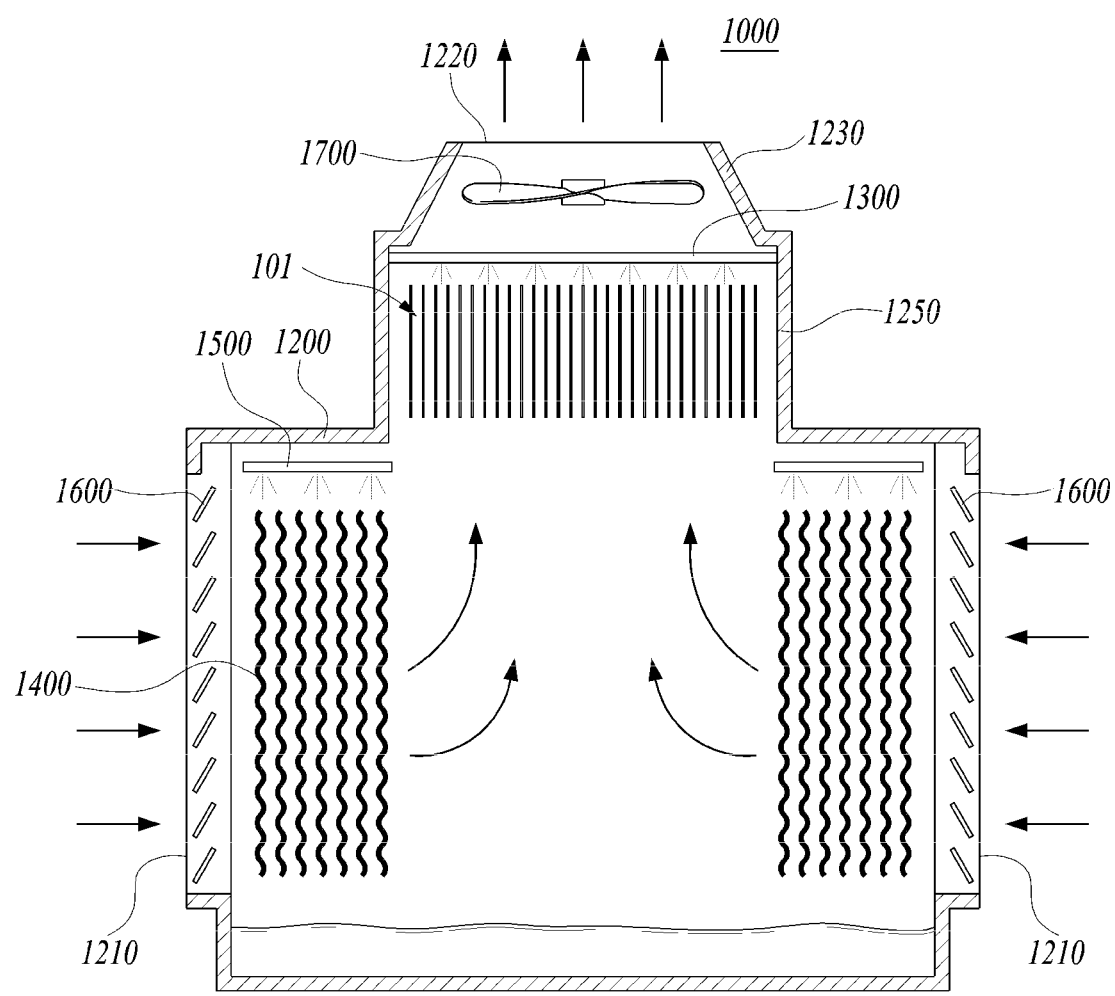
FIG. 2 is a cross-sectional view of the cooling tower according to the first embodiment.

FIG. 1 is a view illustrating the cooling tower according to the first embodiment of the present disclosure, and FIG. 2 is a cross-sectional view of the cooling tower according to the first embodiment.

Referring to FIGS. 1 and 2, the cooling tower 1000 according to the first embodiment is an apparatus that cools cooling water by introducing external air and allowing the air to come into contact with the cooling water. The cooling tower 1000 may include a housing 1200, an electrostatic precipitating apparatus 101, a heat exchanger 1400, a water sprayer 1500, a louver 1600, and a blower 1700. In addition, the electrostatic precipitating apparatus 101 may include an electrostatic precipitator 100, a frame assembly 200, and a washing water supply 1300.

The housing 1200 can be in the form of a hollow box body having a substantially rectangular parallelepiped shape. Alternatively, the housing 1200 may have various other forms, such as a cylinder, polyprism, etc. The housing 1200 may have air inlets 1210 on both (opposing) sides thereof, and an air outlet on an upper side thereof. Solar panels 1810 may be installed on the sidewalls and/or upper surface of the housing 1200, so that the power generated by the solar panels 1810 may be used to drive the electrostatic precipitator 100.

The louver 1600 is disposed in one or more inlets 1210 and guides the inflow of air as well as prevents the escape of the coolant. The louver 1600 may include a plurality of rotary plates, and the direction and amount of air inflow may be controlled according to the rotation of the louver 1600.

The blower 1700 is disposed in a discharge duct 1230 formed in an upper portion of the housing 1200 to allow air to forcedly flow into the inlets 1210 and out of the outlet 1220. The blower 1700 may include a fan and a motor, and is disposed at or on the washing water supply 1300.

The heat exchanger 1400 serves to cool the cooling water using latent heat of evaporation by evaporating the cooling water upon contact between the air and the cooling water. To this end, the heat exchanger 1400 may include a filler, which may be formed from a curved plate or a porous material.

Two heat exchangers 1400 may be disposed in the housing 1200 adjacent to the inlets 1210. However, the present disclosure is not limited thereto, and the heat exchangers 1400 may be disposed on four surfaces (or opposing locations), or may be formed in a circular ring form if the housing 1200 has a cylinder form.

On the other hand, the heat exchanger 1400 may cool the cooling water using indirect heat exchange instead of direct heat exchange. To this end, the heat exchanger 1400 may include a pipe through which the cooling water circulates so that the cooling water may be cooled by heat exchange between the pipe and the air. However, the present disclosure is not limited to the above-mentioned structure of the heat exchanger 1400, and the heat exchanger may have at least some well-known or conventional structures.

The water sprayer 1500 serves to spray the cooling water to the heat exchanger 1400, and may include a coolant supply line and a nozzle. Cooling water injected from the sprayer 1500 is cooled through heat exchange with air in the heat exchanger 1400 and then accumulates for storage in a lower part of the housing 1200. Meanwhile, the air introduced through the louver 1600 is discharged to the outside after being heat-exchanged with the cooling water while flowing through the heat exchanger 1400 in a substantially horizontal direction by the aid of the blower 1700.

The cooling water stored in the lower part of the housing 1200 is supplied to a cooling load facility, and the high temperature cooling water absorbing heat through the cooling load facility is then supplied to the sprayer 1500 so that the cooling water is re-cooled, and this circulation process is repeated.

The housing 1200 is also provided with an electrostatic precipitating space 1250 protruding upward from the housing, and an electrostatic precipitator 100 is disposed in the electrostatic precipitating space 1250. A discharge duct 1230 is disposed above the electrostatic precipitating space 1250.

The electrostatic precipitator 100 may be located above the heat exchanger 1400 and the sprayer 1500, but below the blower 1700. However, the present disclosure is not limited thereto, and the electrostatic precipitator 100 may be disposed above the blower 1700. The electrostatic precipitator 100 may be located at (approximately) the center of the housing 1200 in the width direction, and the heat exchanger 1400 and the water sprayer 1500 may be located in the housing 1200 on a more-lateral side that the electrostatic precipitator 100. That is, the electrostatic precipitator 100 and the heat exchanger 1400 do not overlap in the vertical direction, and thus the washing water does not flow to the heat exchanger 1400.

The washing water supply 1300 is located above the electrostatic precipitator 100 to supply the washing water to the electrostatic precipitator 100 to wash and remove dust attached to the electrostatic precipitating electrodes 13. The washing water supply 1300 receives the cooling water stored in the lower part of the housing 1200, and the washing water falling from the electrostatic precipitator 100 is stored in the lower part of the housing 1200 together with the cooling water that was previously stored in the lower part of the housing 1200.

The washing water supply 1300 operates only when no voltage is applied to the electrostatic precipitator 100, and the operation of the water sprayer 1500 is interrupted while the electrostatic precipitator 100 is being washed. Accordingly, the washing water supply 1300 and the water sprayer 1500 are alternately operated. Thus, when the cooling water is sprayed, the washing water is not sprayed, and when the washing water is sprayed, the cooling water is not sprayed and the blower 1700 is not operated as well. As a result, white smoke is not generated by the washing water.

When the electrostatic precipitator 100 is installed at the upper portion of the cooling tower 1000 as in the first embodiment, the electrostatic precipitator 100 may operate to precipitate rising mist to prevent the occurrence of white smoke. At the same time, the electrostatic precipitator 100 may also operate to precipitate the dust in the air so as to purify the air.

Figure 3:
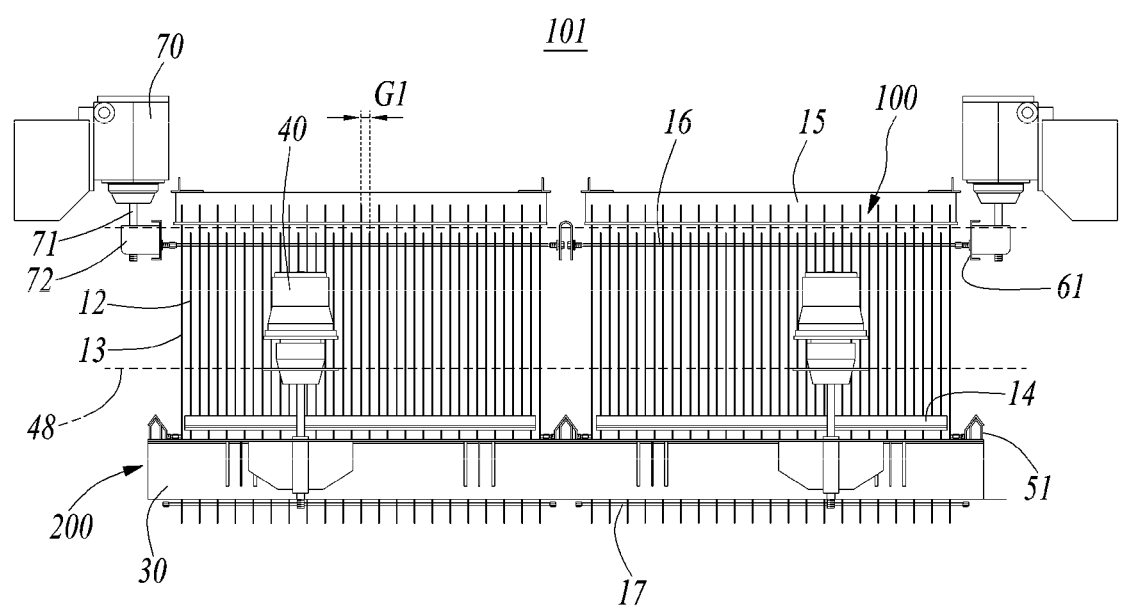
FIG. 3 is a side view illustrating an electrostatic precipitator and a frame assembly of the cooling tower according to the first embodiment.
Figure 4:
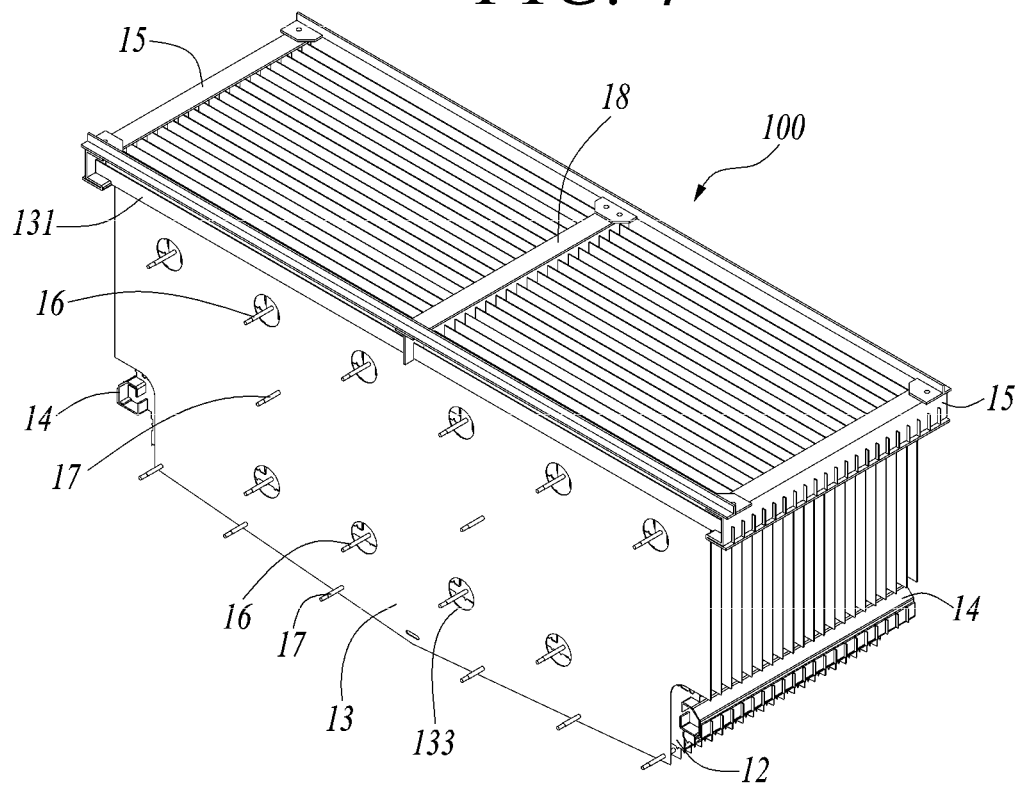
FIG. 4 is a perspective view illustrating an electrostatic precipitator of the cooling tower according to the first embodiment.
Figure 5:
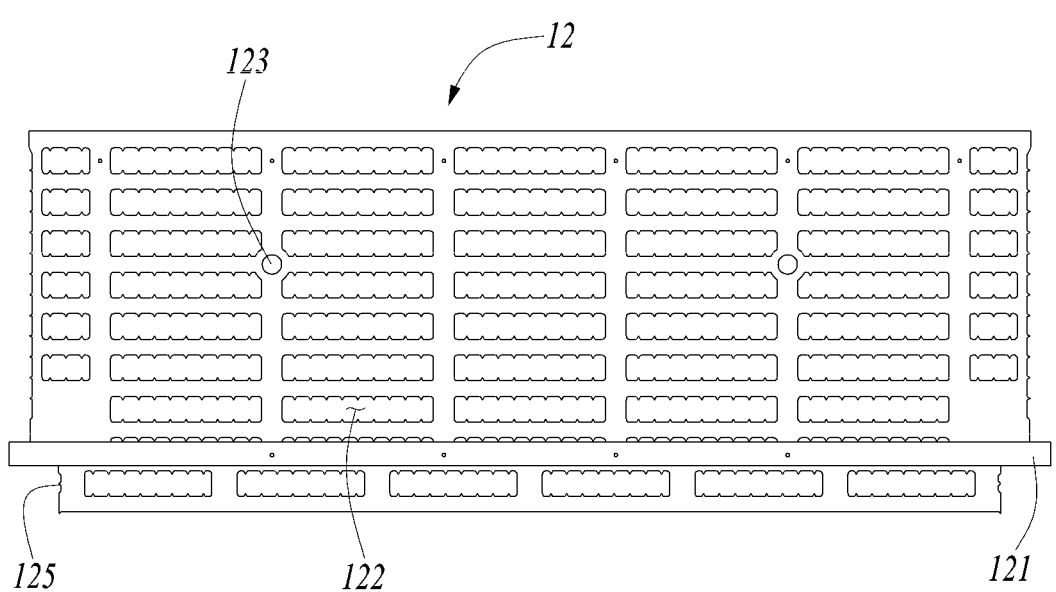
FIG. 5 is a front view illustrating a discharge electrode of the electrostatic precipitator of the cooling tower according to the first embodiment.
Figure 6:
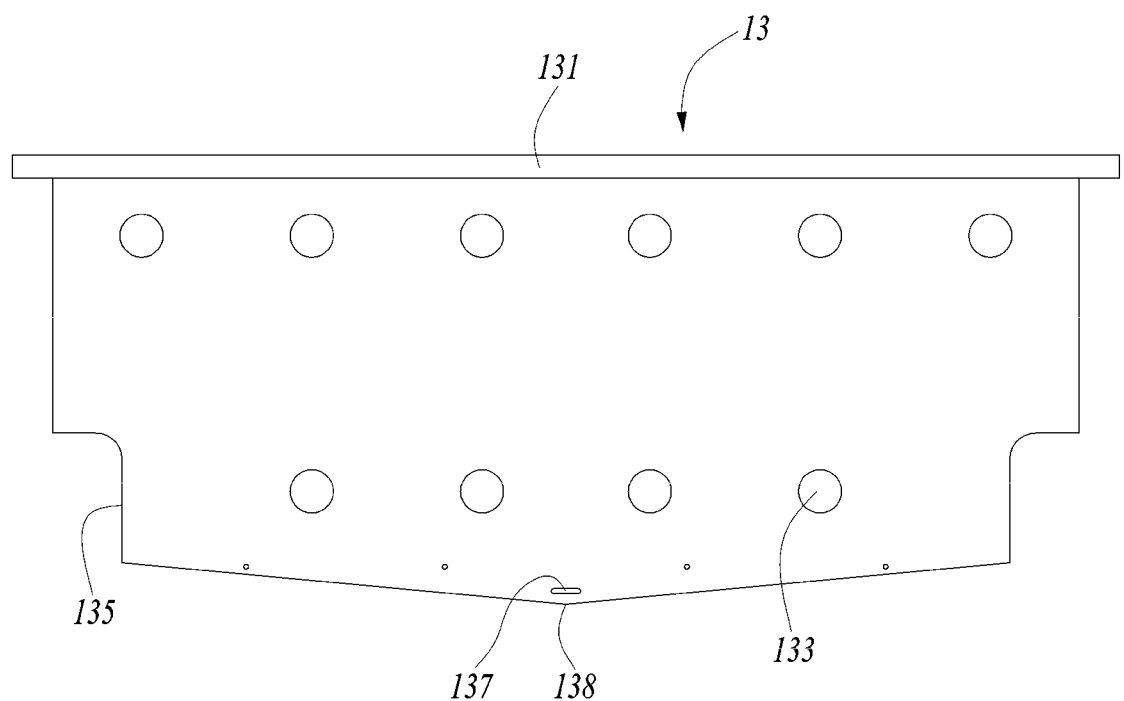
FIG. 6 is a front view illustrating an electrostatic precipitating electrode of the electrostatic precipitator according to the first embodiment.

FIG. 3 is a side view illustrating an electrostatic precipitator and a frame assembly of the cooling tower according to the first embodiment, FIG. 4 is a perspective view illustrating an electrostatic precipitator of the cooling tower according to the first embodiment, FIG. 5 is a front view illustrating a discharge electrode of the electrostatic precipitator of the cooling tower according to the first embodiment, and FIG. 6 is a front view illustrating an electrostatic precipitating electrode of the electrostatic precipitator according to the first embodiment.

Referring to FIGS. 3 to 6, the electrostatic precipitator 100 includes discharge electrodes 12, electrostatic precipitating electrodes 13, first tie rods 16, second tie rods 17, first setting beams 14, second setting beams 15, and central setting beams 18. The electrostatic precipitator 100 may be installed inside the duct 1200 by means of the frame assembly 200 in a state of being fixed by the tie rods 16 and 17 and the setting beams 14, 15 and 18.

The discharge electrode 12 has a flat panel shape with a plurality of rectangular openings 122 and a plurality of discharge fins formed at an edge portion thereof. The discharge fins may have a needle shape, and may be spaced apart from each other along the outer edge and the openings 122 of the discharge electrode 12.

The discharge electrode 12 includes a first reinforcing rod 121 installed at a lower portion thereof, wherein the first reinforcing rod 121 is coupled to the first setting beam 14 to support the discharge electrode 12. The first reinforcing rod 121 extends longer than the width of the discharge electrode 12 so as to protrude from both sides of the discharge electrode 12. In addition, the discharge electrode 12 may be provided with a plurality of first holes 123 through which the second tie rods 17 pass.

In addition, cutout grooves 125 for installing the first setting beams 14 are formed in both lower portions of the discharge electrode 12. The upper portions of each cutout groove 125 and the first reinforcing rod 121 are fixedly inserted together into the first setting beam 14.

The electrostatic precipitating electrode 13 has a flat panel shape having a plurality of second holes 133 through which the first tie rods 16 pass. A second reinforcing rod 131 is disposed on the electrostatic precipitating electrode 13 to support the electrostatic precipitating electrode 13. The second reinforcing rod 131 extends longer than the width of the electrostatic precipitating electrode 13 so as to protrude from both sides of the electrostatic precipitating electrode 13.

The plurality of discharge electrodes 12 and the precipitating electrodes 13 are arranged parallel with each other such that the discharge electrodes 12 are respectively disposed at regular intervals between the precipitating electrodes 13. The gap G1 between the electrostatic precipitating electrode 13 and the discharge electrode 12 may range from 50 mm to 70 mm.

Cutout grooves 135 are formed at both lower sides of the (electrostatic) precipitating electrode 13, and the first setting beam 14 is provided to pass through the cutout grooves 135. An upper end of the cutout groove 135 may be formed above the first reinforcing rod to prevent the (electrostatic) precipitating electrode 13 from being short-circuited with the discharge electrode 12.

A high voltage is applied to the discharge electrode 12, whereby a corona discharge is generated between the discharge electrode 12 and the electrostatic precipitating electrode 13 to create an electrostatic force. During the flowing of air and mist toward a region where the corona discharge and the electrostatic force are generated, a particulate material is charged by ions (electrons) generated by the corona discharge, and the charged particulate material attaches to the electrostatic precipitating electrode 13 with the electrostatic force. Accordingly, dust (or debris) and mist are attached to the electrostatic precipitating electrodes 13 so that the discharge air is purified.

On the other hand, a lower end 134 of the electrostatic precipitating electrode 13 may be formed to be inclined with respect to the ground such that the inclined portion is provided with a lowest part 138. The lowest part 138 may be the center or one side of the lower end of the electrostatic precipitating electrode 13 in the width direction. A fixing hole 137 may be formed above the lowest part 138.

The lower end 134 of the electrostatic precipitating electrode 13 is formed to be inclined downward with respect to the ground from opposing sides toward the center in the width direction. Accordingly, the central portion of the electrostatic precipitating electrode 13 is located below the opposing sides, so that the washing water flowing along the surface of the electrostatic precipitating electrode 13 is collected at the lowest central part 138 along the lower end of the electrostatic precipitating electrode 13.

The first tie rod 16 is inserted and fitted into the plurality of discharge electrodes 12 through the second holes 133 formed in the electrostatic precipitating electrodes 13 without contact with the electrostatic precipitating electrodes 13. The plurality of first tie rods 16 are installed at the upper and lower portions of the discharge electrodes 12.

The first tie rod 16 has a threaded end portion. The first tie rod 16 disposed on the lower side is fixed to a lower support 51, and the first tie rod 16 disposed on the upper side is fixed to an upper support 61.

Meanwhile, the second tie rod 17 is inserted and fitted into the plurality of electrostatic precipitating electrodes 13 through the first holes 123 formed in the discharge electrodes 12 without contact with the discharge electrodes 12.

The second tie rods 17 may be coupled to the upper and lower portions of the electrostatic precipitating electrodes 13, respectively, such that the end portions of the second tie rods 17 are fixed to the electrostatic precipitating electrodes 13. However, the present disclosure is not limited thereto, and the second tie rod 17 may be fixed to other member in the housing 1200.

Spacers may be provided on the first tie rod 16 and the second tie rod 17 to maintain a gap between the discharge electrode 12 and the electrostatic precipitating electrode 13. The spacer provided on the discharge electrode 12 penetrates through the second hole 133 such that the longitudinal end thereof is in contact with the surface of the discharge electrode 12, and the spacer provided on the electrostatic precipitating electrode 13 penetrates through the first hole 123 such that the longitudinal end thereof is in contact with the surface of the electrostatic precipitating electrode 13.

Figure 7:
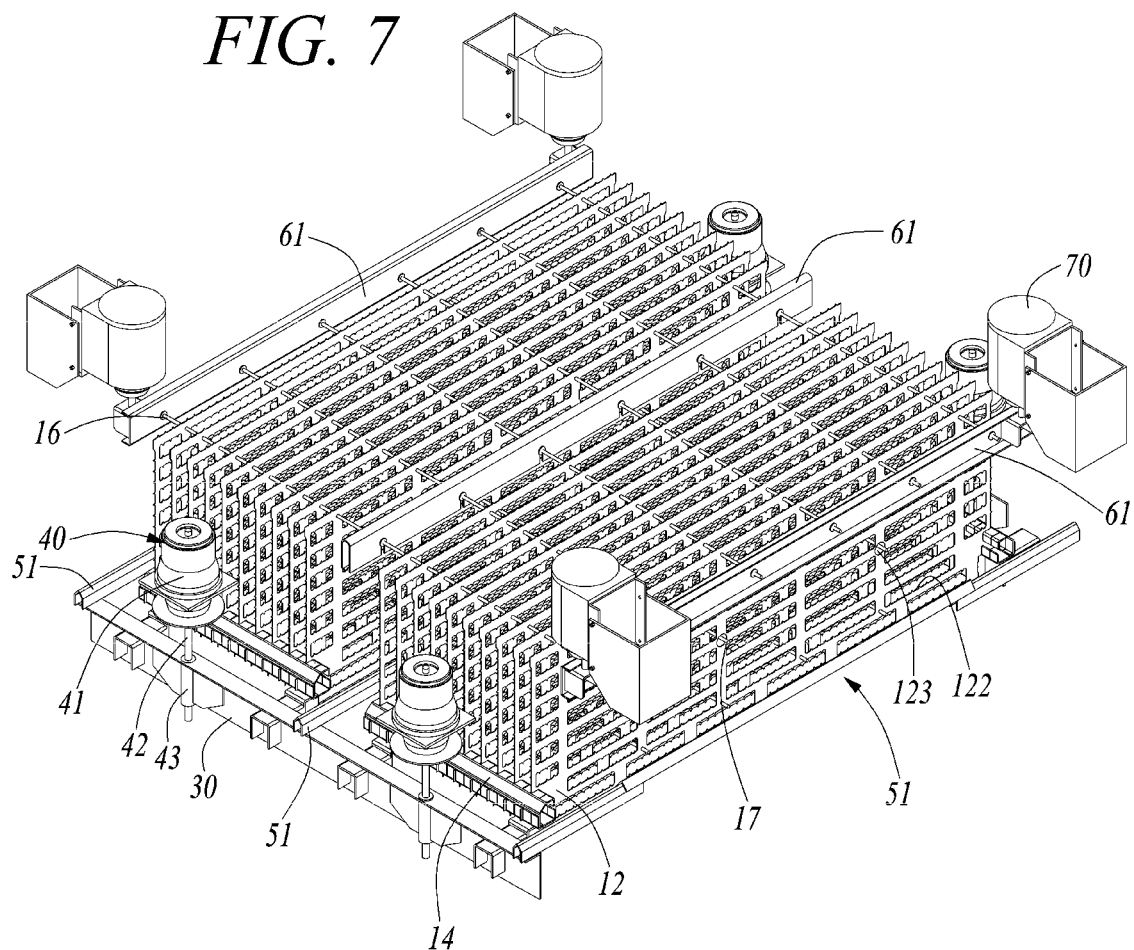
FIG. 7 is a perspective view illustrating a discharge electrode, a support part, and a frame assembly in the electrostatic precipitator according to the first embodiment.
Figure 8:
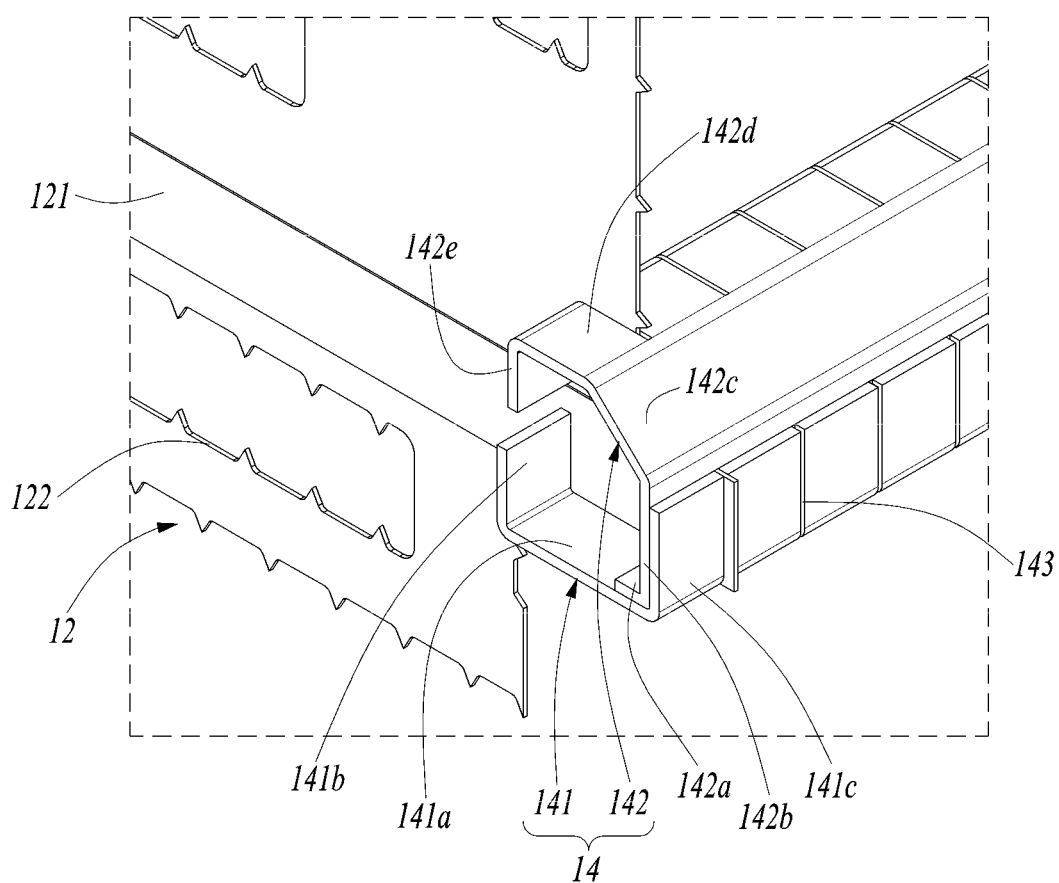
FIG. 8 is a view illustrating a state in which the discharge electrode is supported by a first setting beam of the electrostatic precipitator according to the first embodiment.
Figure 9:
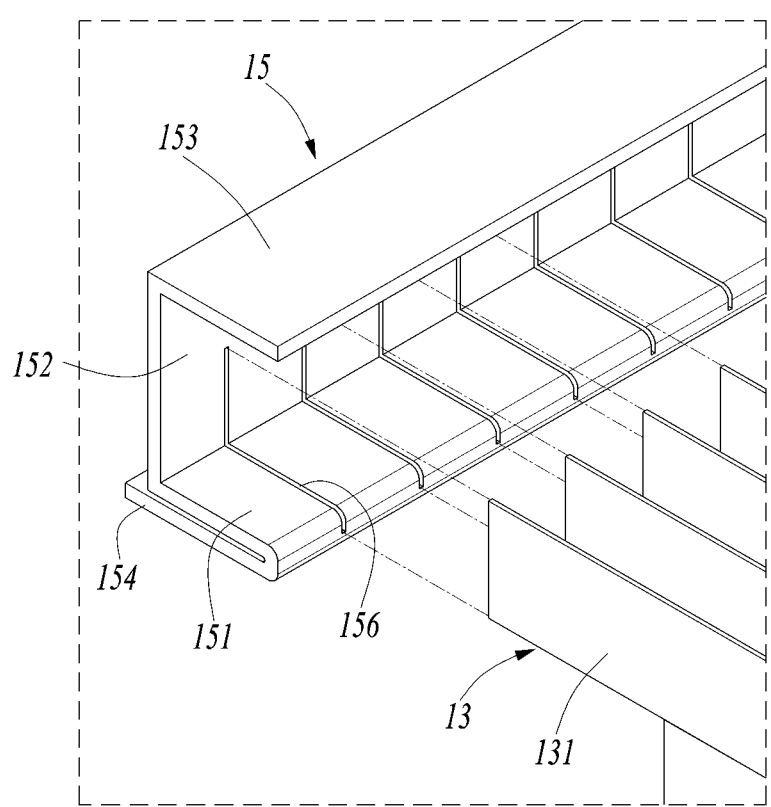
FIG. 9 is an exploded perspective view illustrating a portion of a second setting beam and an electrostatic precipitating electrode according to the second embodiment.

FIG. 7 is a perspective view illustrating a discharge electrode, a support part, and a frame assembly in the electrostatic precipitator according to the first embodiment, FIG. 8 is a view illustrating a state in which the discharge electrode is supported by a first setting beam of the electrostatic precipitator according to the first embodiment, and FIG. 9 is an exploded perspective view illustrating a portion of a second setting beam and an electrostatic precipitating electrode according to the second embodiment.

Referring to FIGS. 7 to 9, the first setting beam 14 is formed to extend in the stacking direction of the discharge electrodes 12, and has a plurality of lower slots 143 into which a plurality of side ends of the discharge electrodes 12 are inserted. The first reinforcing rod 121 is inserted through the first setting beam 14 such that the lower end of the first reinforcing rod 121 is supported by the bottom of the first setting beam 14.

The first setting beam 14 may include a lower beam 141 and an upper beam 142 coupled to the lower beam 141. The lower beam 141 has a bottom portion 141a and two side walls 141b and 141c which are bent and protrude upwards from both side ends of the bottom portion 141a. The upper beam 142 has a lower support portion 142a contacting the bottom portion 141a, an outer support portion 142b that are bent from the lower support portion 142a so as to abut against the side wall 141c, an inclined portion 142c bent inclined from the outer support portion 142b, an upper support portion 142d bent parallel with the bottom portion 141a from the inclined portion 142c, and an inner support portion 142e bent downwards from the upper support portion 142d. Moisture existing on the first setting beam 14 can be easily discharged to the outside through the inclined portion 142c.

The lower slots 143 are formed not in the bottom portion 141a, but in the side walls 141b and 141c. The lower slots 143 are also provided in the upper beam 142 at the lower support portion 142a and the outer support portion 142b. The lower slots 143 formed in the lower and upper beams 141 and 142 communicate with each other, and the first reinforcing rods 121 protrude to the outside through the lower slots 143 formed in the outer sidewall 141b and the outer support portion 142b.

When the upper beam 142 and the lower beam 141 are coupled to each other, the first setting beam 14 is formed into a tubular shape with one side surface cut out. When the first setting beam 14 can be divided into the upper beam 142 and the lower beam 141, the discharge electrode 12 can be easily welded to the lower beam 141. That is, in a state in which the discharge electrode 12 is welded to the lower beam 141, when the upper beam 142 is coupled to the lower beam 141 and the discharge electrode 12 is welded to the upper beam 142, the discharge electrode 12 can be stably fixed to the first setting beam 14 with the first setting beam 14 formed into a tubular form.

The first reinforcing rod 121 may be made of the same material as the first setting beam 14, and may be thicker than the discharge electrode 12. Thus, the first reinforcing rod 121 may be easily welded to the first setting beam 14. The discharge electrode 12 should have a minimized thickness and excellent electric conductivity. However, if the discharge electrode 12 has high conductivity and a small thickness, there is a problem in that welding is difficult. As described above, according to the first embodiment, since the discharge electrode 12 includes the first reinforcing rod 121, the discharge electrode 12 can be easily welded to the first setting beam 14.

The second setting beam 15 is formed to extend in the stacking direction of the electrostatic precipitating electrodes 13, and has a plurality of upper slots 156 into which the side ends of the electrostatic precipitating electrodes 13 are inserted. The upper slots 156 may be spaced along a longitudinal direction of the second setting beam 15, and the second setting beam 15 may be located above the first setting beam 14. As illustrated in FIG. 2, a central setting beam 18 is formed at the center of the upper end of the electrostatic precipitating electrode 13 in the widthwise direction thereof, wherein the central setting beam 18 is formed in a T-shape, and has a plurality of slots for inserting the upper center of the electrostatic precipitating electrode 13 therethrough.

The second reinforcing rod 131 is fixed to the upper end of the electrostatic precipitating electrode 13 through the second setting beam 15. The second reinforcing rod 131 is installed to penetrate the second setting beam 15 such that a lower end of the second reinforcing rod 131 is supported by the second setting beam 15.

The second setting beam 15 includes a lower plate 151, a side plate 152 bent upward from the lower plate 151, an upper plate 153 bent opposite to the lower plate 151 from the side plate 152, and a support plate 154 disposed below the lower plate 151. A second reinforcing rod 131 is inserted into a part of the lower plate 151 and the side plate 152 such that a lower end thereof abuts against an upper surface of the support plate 154. The second reinforcing rod 131 may be welded to the second setting beam 15.

As described above, the electrostatic precipitator 100 according to the first embodiment includes the first tie rod 16, the second tie rod 17, the first setting beam 14, and the second setting beam 15, thereby having an effect of stably fixing the discharge electrodes and the electrostatic precipitating electrodes while maintaining a distance therebetween.

Figure 10:
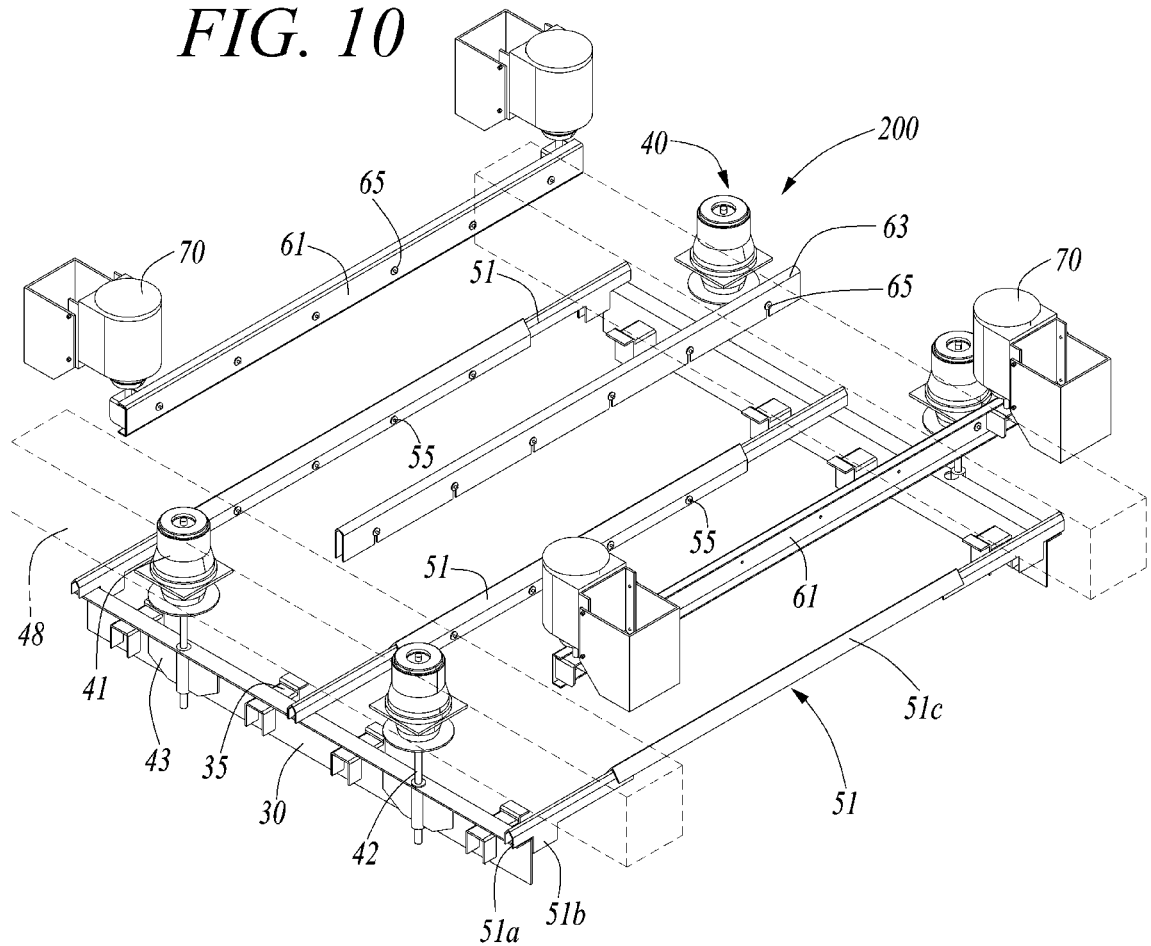
FIG. 10 is a perspective view illustrating a frame assembly of the electrostatic precipitator according to the first embodiment.
Figure 11:
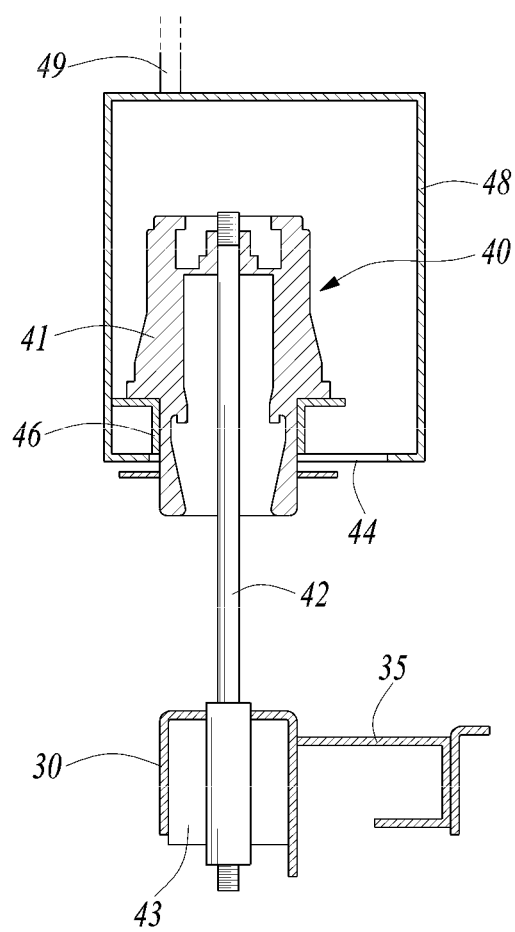
FIG. 11 is a cross-sectional view illustrating an insulating connector member and a lower frame of the electrostatic precipitator according to the first embodiment.

FIG. 10 is a perspective view illustrating a frame assembly of the electrostatic precipitator according to the first embodiment, and FIG. 11 is a cross-sectional view illustrating an insulating connector member and a lower frame of the electrostatic precipitator according to the first embodiment.

Referring to FIGS. 10 and 11, the frame assembly 200 includes lower frames 30, a tubular girder 48, outer upper supports 61, lower supports 51, prestressing locking members 70, and insulating connecting members 40.

The lower frames 30 are formed to extend in the stacking direction of the discharge electrodes 12 and the electrostatic precipitating electrodes 13 and are supported by the insulating connecting members 40. Two lower frames 30 are arranged in parallel, and two insulating connecting members 40 are provided to each lower frame 30. The lower frames 30 are provided with a plurality of cradles 35 protruding towards the lateral sides of the lower frames 30, and the first setting beams 14 are mounted on the cradles 35. The lower frame 30 is applied with a high voltage, and thus the first setting beam 14 and the discharge electrodes 12 are also applied with a high voltage through the lower frame 30. Here, the charging voltage of the discharge electrode 12 may range from 25,000 V to 75,000 V.

The lower supports 51 extend in the spacing direction of the lower frames 30 and thus are held on two lower frames 30 such that the lower supports 51 are disposed at the outer side and the center of the electrostatic precipitator 100, respectively. The lower support 51 includes side protrusions 51a positioned on the lower frames 30, lower protrusions 51b projecting downward to abut the side surface of the lower frame 30, and a support bar 51c to which the first tie rod 16 is fixed.

The lower support 51 is provided with a plurality of connectors 55 to which the first tie rods 16 are screw-coupled. Both longitudinal ends of the first tie rod 16 are fixed between the outer lower support 51 and the central lower support 51.

As described above, according to the first embodiment, the electrostatic precipitator 100 can be easily fixed to the frame assembly 200 by fastening the first tie rods 16 to the lower supports.

The lower frames 30 are provided with the insulating connecting members 40 each having a terminal rod 42 used for applying a high voltage to the discharge electrode 12 and a lower insulator 41. A hole that allows air to be injected downward may be formed in the lower portion of the insulating connecting member 40. The terminal rod 42 protrudes downward through the hole and is fixed to the lower frame 30. The terminal rod 42 is provided with an anchor 43 for supporting the lower frame 30.

Accordingly, a high voltage is applied to the discharge electrode 12 through the lower frames 30 and the first setting beams 14. Further, the lower frames 30 are installed in a state of being suspended from the insulating connecting members 40.

The insulating connecting member 40 is installed in the tubular girder 48 having an inner space, and the tubular girder 48 is formed to extend in the same direction as the lower frame 30. The tubular girder 48 may be fixedly installed on an inner wall of the housing 1200, and may be provided with a purge air supply pipe 49 therein. A vent hole 44 may be provided on the lower side of the tubular girder 48 to discharge purge air therethrough.

A holder 46 is provided in the tubular girder 48 to support the lower insulator 41, which is held on the holder 46. A high voltage source is connected to the insulating connecting member 40, and the terminal rod 42 is fixed to the tubular girder 48 via the lower insulator 41 for electric insulation. The terminal rod 42 may be installed to penetrate through the center of the lower insulator 41, and a power supply line may be connected to an upper end of the terminal rod 42. Accordingly, the terminal rod 42 may be charged with a high voltage, and the tubular girder 48 may be grounded.

The second setting beams 15 are fixed to an upper surface of the tubular girder 48 such that lower ends thereof are fixed to the tubular girder 48 by means of welding or the like. The second setting beams 15 are arranged to extend in the same direction as the longitudinal direction of the tubular girder 48.

Figure 12:
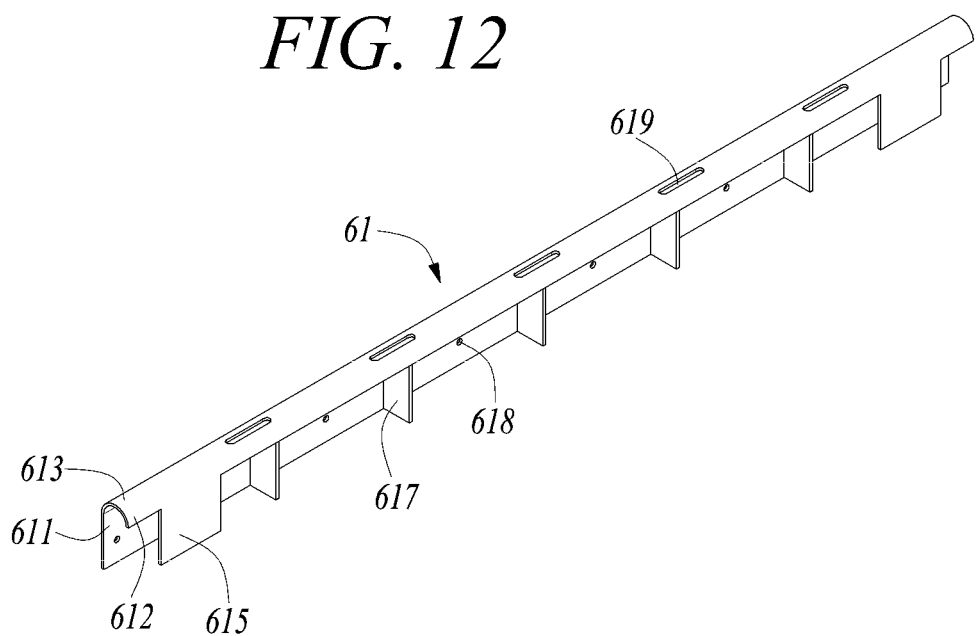
FIG. 12 is a perspective view illustrating an outer upper support of the electrostatic precipitator according to the first embodiment.
Figure 13:
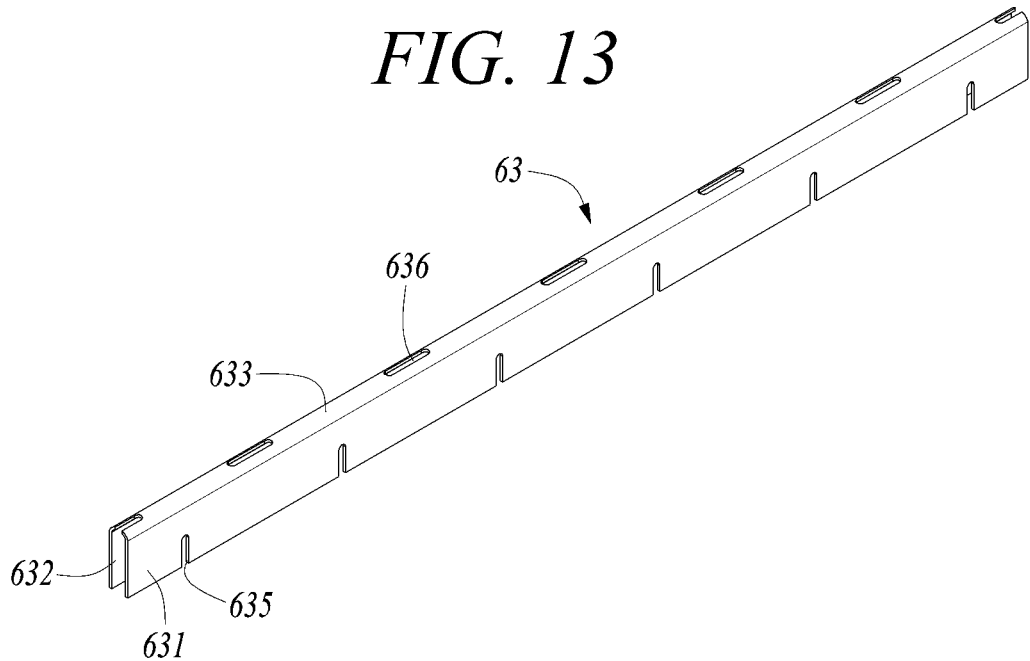
FIG. 13 is a perspective view illustrating a central upper support of the electrostatic precipitator according to the first embodiment.

FIG. 12 is a perspective view illustrating an outer upper support of the electrostatic precipitator according to the first embodiment, and FIG. 13 is a perspective view illustrating a central upper support of the electrostatic precipitator according to the first embodiment.

Referring to FIGS. 12 and 13, the outer upper supports 61 are disposed on the electrostatic precipitator 100 at both outer ends thereof, respectively. The central upper support 63 may be disposed between the outer upper supports 61 at the central upper portion of the electrostatic precipitator 100.

A plurality of connectors 65 (in FIG. 10) to which the first tie rods 16 are coupled is provided to the outer upper supports 61 and the central upper support 63, wherein the connector 65 is screw-coupled to the first tie rod 16 to fix the first tie rod. The first tie rod 16 is connected such that one longitudinal end portion thereof is fixed to the outer upper support 61, and the other longitudinal end portion is fixed to the central upper support 63. The outer upper support 61 includes a front plate 611 and a rear plate 612, which face each other, and a support plate 613 connecting the front plate 611 and the rear plate 612. The front plate 611 and the rear plate 612 may have a flat shape, and the support plate 613 may have a curved shape. The support plate 613 is provided with a plurality of holes 619 for discharging the washing water. In addition, the front plate 611 may be provided with holes 618 for the connectors 65.

The rear plate 612 has a smaller height than that of the front plate 611, and a coupling plate 615 protruding downward is formed at a portion where the prestressing locking member 70 is coupled on the rear plate 612. The coupling plates 615 are located at both longitudinal edges of the outer upper support 61.

In addition, the outer upper support 61 further includes reinforcing ribs 617, which are located between the front plate 611 and the rear plate 612 to abut against and support inner surfaces of the front plate 611 and the rear plate 612. The reinforcing ribs 617 are spaced apart in the longitudinal direction of the outer upper support 61.

On the other hand, the central upper support 63 includes two wall surfaces 631 and 632 extending downwards, and a curved support surface 633 connecting the wall surfaces 631 and 632. A plurality of grooves 635 into which the connectors 65 are inserted may be formed in the wall surfaces 631 and 632, and a plurality of holes 636 for discharging the washing water may be formed in the support surface 633.

A prestressing locking member 70 is resiliently connected to the outer upper support 61. The prestressing locking member 70 is fixedly connected in a state of compressing the outer upper support 61 inwards to reduce vibration of the electrostatic precipitator 100.

Figure 14:
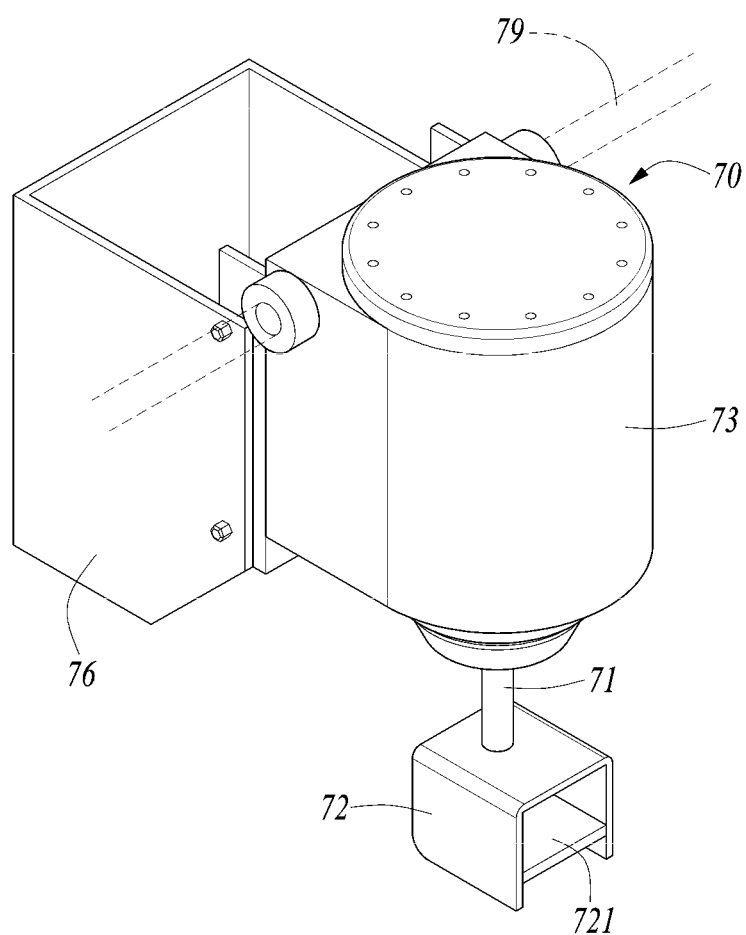
FIG. 14 is a perspective view illustrating a prestressing locking member of the electrostatic precipitator according to the first embodiment.
Figure 15:
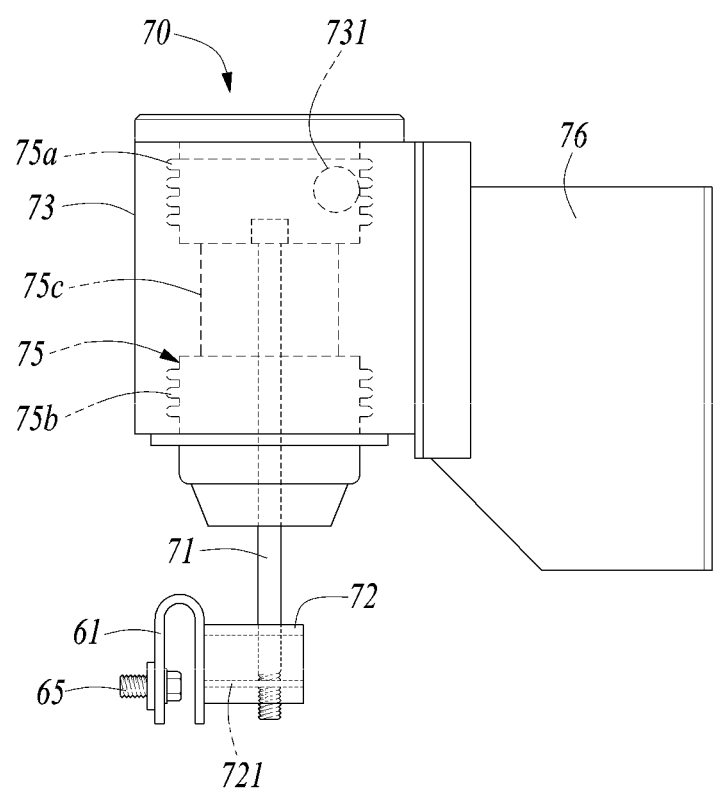
FIG. 15 is a side view illustrating the prestressing locking member of the electrostatic precipitator according to the first embodiment.

FIG. 14 is a perspective view illustrating a prestressing locking member of the electrostatic precipitator according to the first embodiment, and FIG. 15 is a side view illustrating the prestressing locking member of the electrostatic precipitator according to the first embodiment.

Referring to FIGS. 14 and 15, the prestressing locking member 70 is fixed to the inner wall of the housing 1200. The prestressing locking member 70 includes a casing 73, an insulator 75 installed in the casing 73, a pressing rod 71 coupled to the insulator 75, and a pressing support 72 coupled to the pressing rod 71.

The casing 73 is formed to have a cylindrical shape with an inner space, and a bracket 76 for fixing to the housing 1200 is fixed to one side of the casing 73. In addition, an air inlet 731 may be provided in the casing 73, and a purge air supply pipe 79 may be connected to the air inlet 731. The purge air introduced into the casing 73 is discharged to the bottom to prevent possible short circuits due to moisture.

The insulator 75 may include an upper insulator part 75a fixed to the upper portion of the casing 73, a lower insulator part 75b fixed to the lower portion of the casing 73, and an insulating tube 75c connecting the upper insulator part 75a and the lower insulator part 75b. The pressing rod 71 is fixed to the insulator 75 so as to protrude below the prestressing locking member 70. The lower portion of the pressing rod 71 is formed with a thread for fastening with the pressing support 72.

The pressing support 72 is fixed to the lower portion of the pressing rod 71 and the pressing support 72 includes an inner support plate 721 for coupling with the pressing rod 71. The inner support plate 721 is screw-coupled with the pressing rod 71. The pressing support 72 contacts the outer upper support 61 to force the outer upper support 61 into the electrostatic precipitator 100.

As described above, when the outer upper support 61 is installed in a state of being pressurized by the prestressing locking member 70, the vibration of the electrostatic precipitator 100 can be efficiently reduced.

Figure 16:
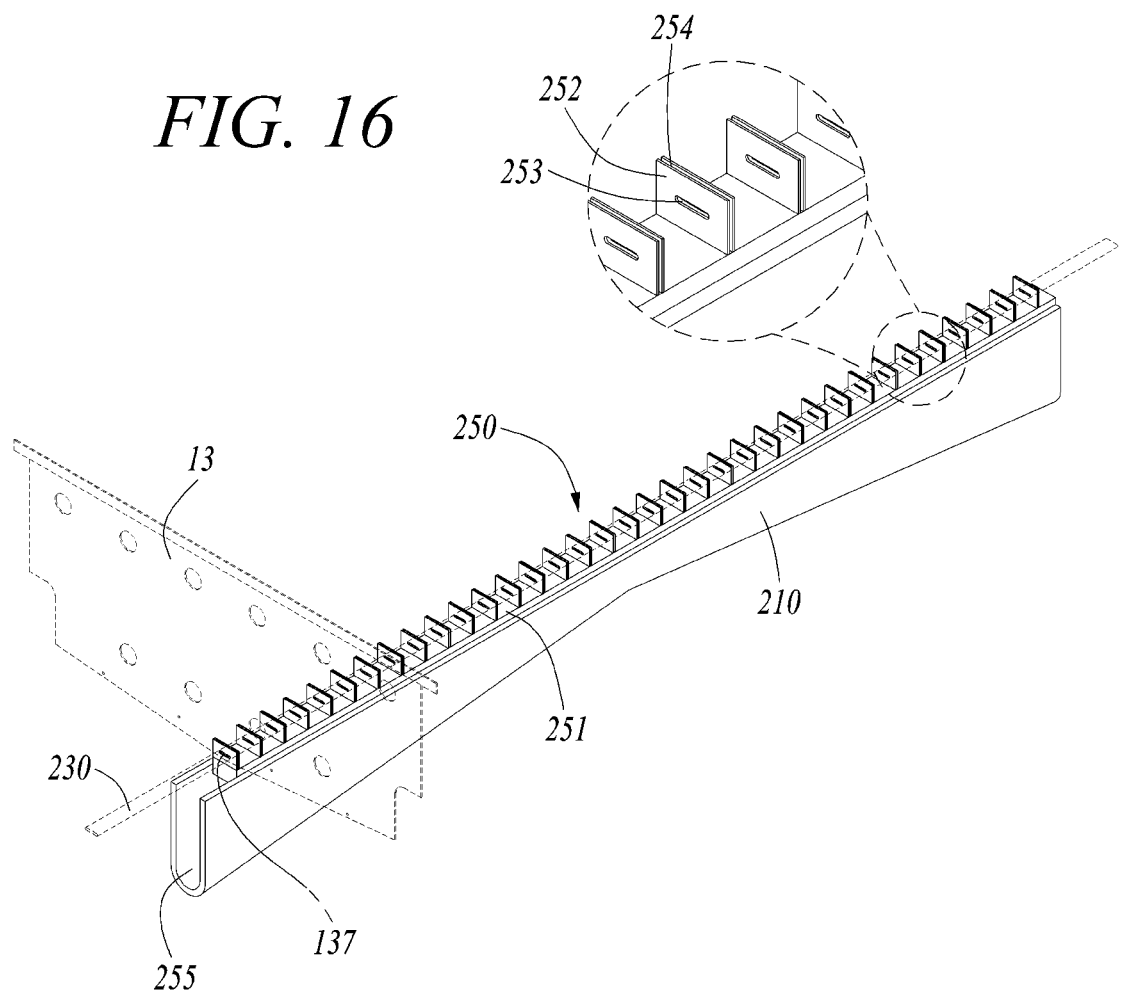
FIG. 16 is a perspective view illustrating a support hanger and a discharge guide of an electrostatic precipitator according to a second embodiment.

Hereinafter, a cooling tower according to a second embodiment of the present disclosure will be described. FIG. 16 is a perspective view illustrating a support hanger and a discharge guide of an electrostatic precipitator according to a second embodiment.

Referring to FIG. 16, since the cooling tower according to the second exemplary embodiment has the same structure as the cooling tower according to the first exemplary embodiment except that a support hanger 250 and a discharge guide 210 are installed on an electrostatic precipitator, a repeated description for the same structure will be omitted.

A support hanger 250 and a discharge guide 210 for collecting contaminated washing water discharged from the electrostatic precipitating electrode 13 are disposed at the lower portion of the electrostatic precipitator 100. The electrostatic precipitating electrode 13 is provided with a central fixing hole 137, into which a fixing rod 230 extending in the stacking direction of the precipitating electrodes 13 is inserted and fitted. The fixing rod 230 is combined with the support hanger 250 to fix the support hanger 250 to the electrostatic precipitating electrodes 13.

The support hanger 250 has a lower support bar 251 extending in the stacking direction of the electrostatic precipitating electrodes 13, and connection protrusions 252 protruding upward from the lower support bar 251 so as to connect the lower ends of the precipitating electrodes 13. The connection protrusion 252 is provided with a connection groove 254 having a support hole 253 into which the fixing rod 230 is inserted.

The connection protrusion 252 may be composed of two plates spaced apart from each other by a gap constituting the connection groove 254. The connection protrusions 252 are spaced apart in the longitudinal direction of the lower support bar 251 such that the connection protrusions are respectively fixed to the lower ends of the precipitating electrodes 13. The support hole 253 and the fixing hole 137 are aligned together, so that the fixing rod 230 penetrates through both the support hole 253 and the fixing hole 137. Accordingly, the support hanger 250 may be stably fixed to the lower ends of the electrostatic precipitating electrodes 13.

The discharge guide 210 is disposed at the center of the electrostatic precipitating electrode 13 in the width direction, and the width of the discharge guide 210 is smaller than the width of the electrostatic precipitating electrode 13. For example, the width of the discharge guide 210 may be $1/100$ to $1/10$ of the width of the electrostatic precipitating electrode 13.

The discharge guide 210 has an open upper portion and a channel 255 through which the washing water flows. The discharge guide 210 may be formed such that the bottom has a slope in which the height increases from the central portion thereof towards opposite sides thereof in the longitudinal direction.

Accordingly, the washing water introduced into the discharge guide 210 may flow to the opposite sides of the discharge guide 210. Discharge pipes for discharging the washing water may be connected to the opposite sides of the discharge guide 210.

The electrostatic precipitating electrode 13 has a lower end that is inclined so that the center portion thereof protrudes downward. Accordingly, the washing water flowing along the surface of the electrostatic precipitating electrode 13 is finally collected toward the lowest portion at the central portion of the precipitating electrode 13. After accumulating at the lower central portion of the electrostatic precipitating electrode 13, the washing water may be introduced into the discharge guide 310 and then discharged to the outside.

As described above, according to the second embodiment, the support hanger 250 and the discharge guide 210 are provided to the lower end of the electrostatic precipitating electrode 13 to stably discharge the washing water with minimal disruption of air flow and to prevent the washing water containing impurities from contaminating the cooling water as well.

Figure 17:
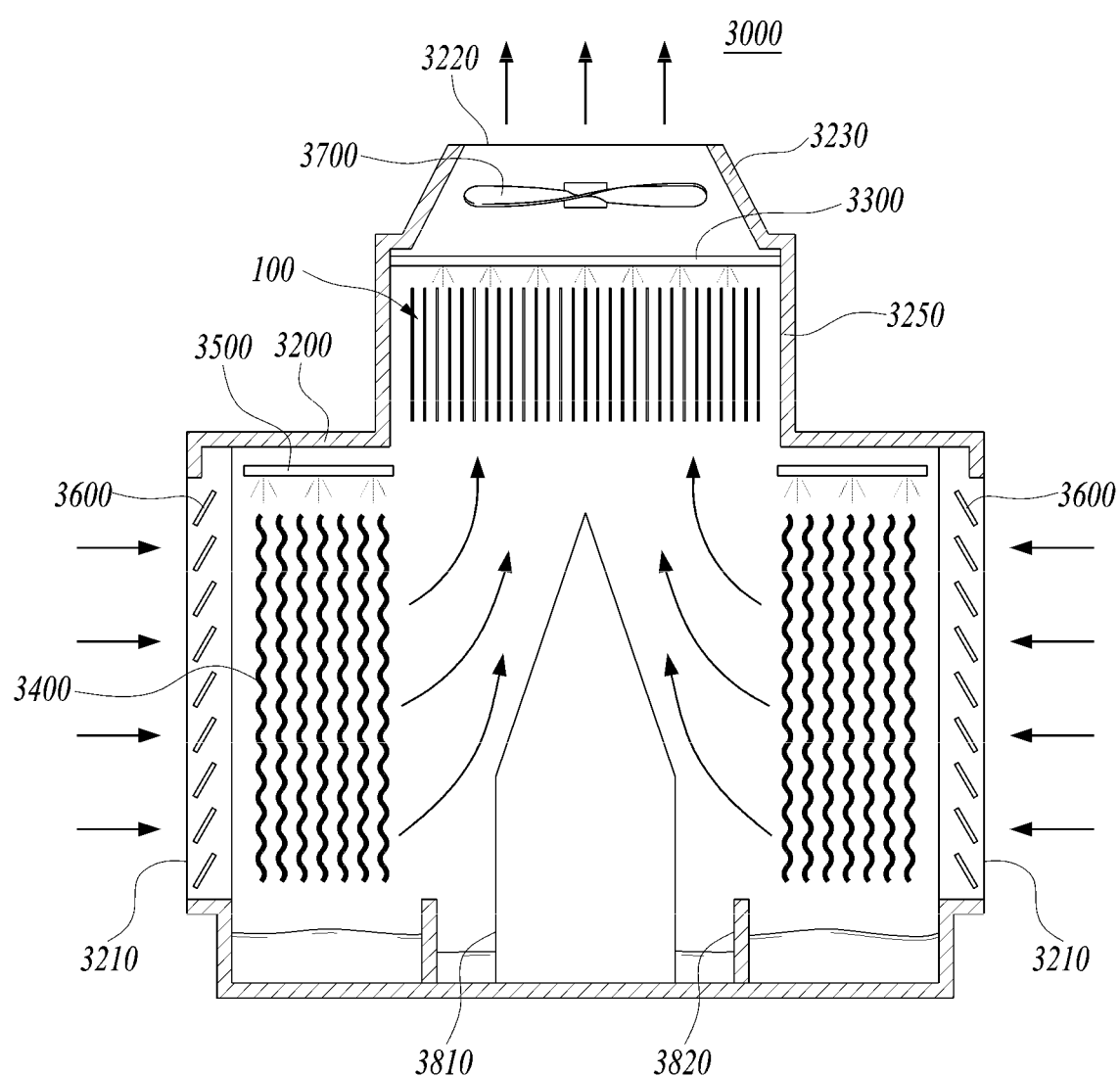
FIG. 17 is a cross-sectional view illustrating a cooling tower according to a third embodiment.

Hereinafter, a cooling tower according to a third embodiment of the present disclosure will be described. FIG. 17 is a cross-sectional view illustrating the cooling tower according to the third embodiment of the present disclosure.

Referring to FIG. 17, the cooling tower 3000 according to the third embodiment is an apparatus that cools cooling water by introducing external air and allowing the air to come into contact with the cooling water. The cooling tower 3000 may include a housing 3200, an electrostatic precipitator 100, a heat exchanger 3400, a water sprayer 3500, a washing water supply 3300, a louver 3600, and a blower 3700.

The housing 3200 can be in the form of a hollow box body having a substantially rectangular parallelepiped shape. Alternatively, the housing 3200 may have various other forms, such as a cylinder, polyprism, etc. The housing 3200 may have air inlets 3210 on both (opposing) sides thereof, and an air outlet on an upper side thereof.

The louver 3600 is disposed in the inlet 3210 and guides the inflow of air as well as prevents the escape of the coolant. The louver 3600 may include a plurality of rotary plates, and the direction and amount of air inflow may be controlled according to the rotation of the louver.

The blower 3700 is disposed in a discharge duct 3230 formed in an upper portion of the housing 3200 to allow air to forcedly flow into the inlets 3210 and out of the outlet 3220. The blower 3700 may include a fan and a motor, and is disposed at or on the washing water supply 3300.

The heat exchanger 3400 serves to cool the cooling water using latent heat of evaporation by evaporating the cooling water by contact between the air and the cooling water. To this end, the heat exchanger 3400 may include a filler, which may be formed from a curved plate or a porous material.

Two heat exchangers 3400 may be disposed in the housing 3200 adjacent to the inlets 3210. However, the present disclosure is not limited thereto, and the heat exchanger 3400 may be disposed on four surfaces, or may be formed in a circular ring form if the housing 3200 has a cylinder shape.

The water sprayer 3500 serves to spray the cooling water to the heat exchanger 3400, and may include a coolant supply line and a nozzle. Cooling water injected from the sprayer 3500 is cooled through heat exchange with air in the heat exchanger 3400 and then accumulates for storage in a lower part of the housing 3200. Meanwhile, the air introduced through the louver 3600 is discharged to the outside after being heat-exchanged with the cooling water while flowing through the heat exchanger 3400 in a substantially horizontal direction by the aid of the blower 3700.

The cooling water stored in the lower part of the housing 3200 is supplied to a cooling load facility, and the high temperature cooling water absorbing heat through the cooling load facility is then supplied to the sprayer 3500 so that the cooling water is re-cooled, and this circulation process is repeated.

An electrostatic precipitating space 3250 protruding upward is formed on an upper portion of the housing 3200, and an electrostatic precipitator 100 is disposed in the electrostatic precipitating space 3250. A discharge duct 3230 is disposed above the electrostatic precipitating space 3250.

The electrostatic precipitator 100 may be located above the heat exchanger 3400, but below the blower 3700. However, the present disclosure is not limited thereto, and the electrostatic precipitator 100 may be disposed above the blower 3700. Since the electrostatic precipitator 100 and the washing water supply 3300 have the same structure as in the first embodiment, a detailed description thereof will be omitted.

A guide post 3810 is disposed between the heat exchangers 3400. The guide post 3810 may have a wedge shape in which the width gradually decreases toward the upper end. The guide post 3810 may be formed to extend to ⅔ to 3/3 of the height of the heat exchanger 3400. The guide post 3810 serves to guide the air flowing toward the center of the housing 3200 through the opposite heat exchangers 3400 to flow upward in the housing 3200 along the outer surface thereof without colliding with each other. To this end, the upper portion of the guide post 3810 is tapered so that the width thereof decreases toward the upper portion. In addition, the guide post 3810 also guides the washing water falling from the upper side to flow downward along the outer surface thereof without spreading laterally.

The bottom of the housing 3200 is provided with an internal water reservoir 3820 having a circumferential space divided into an inner space and an outer space. For example, the washing water may be stored in the inner space of the water reservoir 3820 and the cooling water may be stored in the outer space of the water reservoir 3820. Accordingly, the cooling water can be prevented from being contaminated by the washing water containing dust or debris. The washing water stored in the water reservoir 3820 may be supplied again to the washing water supply 3300 after being discharged or purified.

Figure 18:
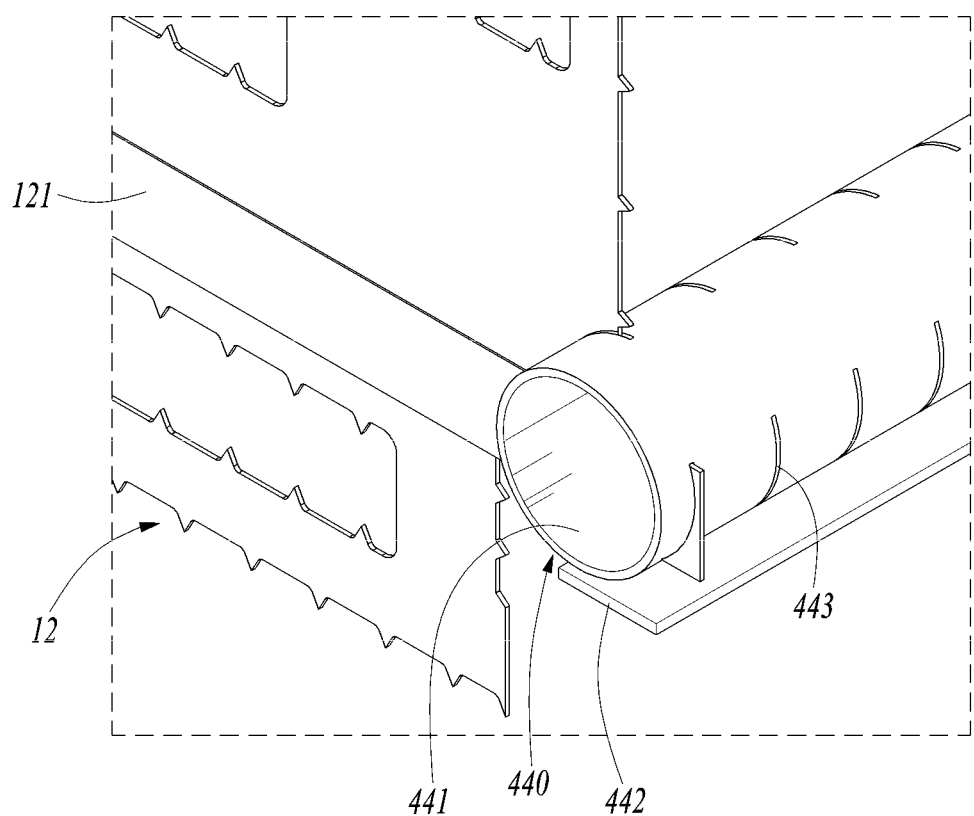
FIG. 18 is a partial perspective view illustrating a first setting beam and a discharge electrode in a cooling tower according to a fourth embodiment of the present disclosure.

Hereinafter, an electrostatic precipitator according to a fourth embodiment of the present disclosure will be described. FIG. 18 is a partial perspective view illustrating a first setting beam and a discharge electrode according to the fourth embodiment of the present disclosure.

Referring to FIG. 18, the electrostatic precipitator according to the fourth embodiment has the same structure as that of the cooling tower according to the first embodiment except for a first setting beam, so a repeated description of the same constitution will be omitted.

The first setting beams 440 are formed to extend in the stacking direction of the discharge electrodes 12, and each have a plurality of lower slots 443 into which the side ends of the discharge electrodes 12 are inserted. A first reinforcing rod 121 is inserted into the first setting beam 440 such that the lower end of the first reinforcing rod 121 is supported by the first setting beam 440.

The first setting beam 440 includes a tubular support tube 441 having a circular cross section and a lower support plate 442 fixed to the lower end of the support tube 441. A plurality of lower slots 443 are formed in the support tube 441 and the side ends of the first reinforcing rod 121 and the discharge electrode 12 are inserted into the lower slots 443.

On the other hand, the lower support plate 442 has a flat plate shape and is fixed to the lower end of the support tube 441. The lower support plate 442 abuts against the lower surface of the first reinforcement rod 121 to support the first reinforcement rod 121.

As described above, according to the fourth embodiment, the first setting beam 440 and the discharge electrode 12 can be more easily coupled.

Figure 19:
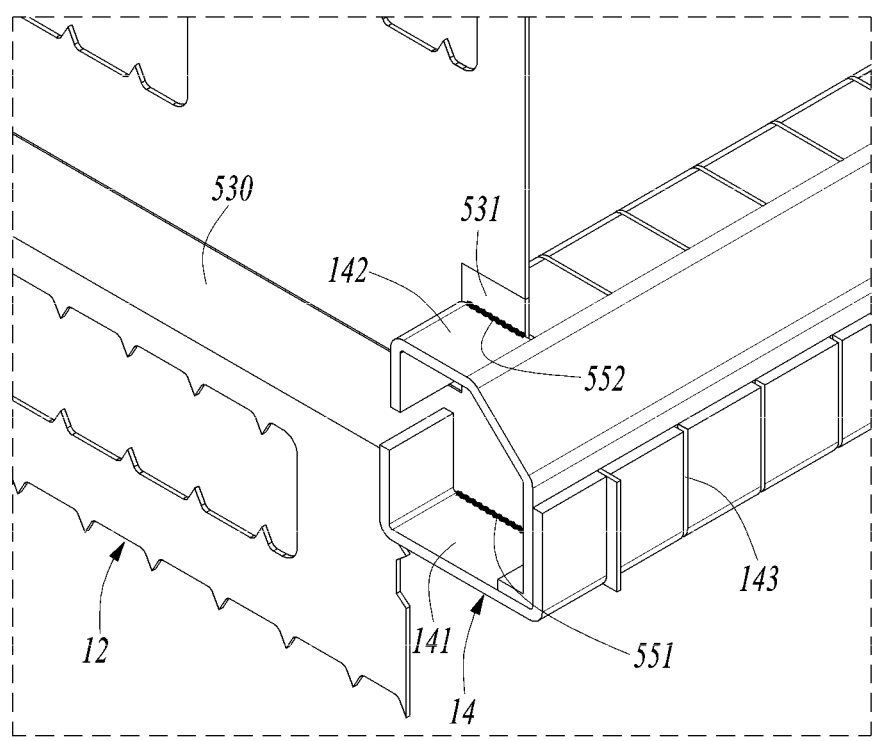
FIG. 19 is a partial perspective view illustrating a first setting beam and a discharge electrode in a cooling tower according to a fifth embodiment of the present disclosure.

Hereinafter, an electrostatic precipitator according to a fifth embodiment of the present disclosure will be described. FIG. 19 is a partially perspective view illustrating a first setting beam and a discharge electrode according to the fifth embodiment of the present disclosure.

Referring to FIG. 19, the electrostatic precipitator according to the fifth embodiment has the same structure as that of the electrostatic precipitator according to the first embodiment except for the structure of a first reinforcing rod 530, so a repeated description of the same structure will be omitted.

The discharge electrode 12 includes a first reinforcing rod 630 installed at a lower portion of the plate, where the first reinforcing rod 530 is coupled to the first setting beam 14 to support the discharge electrode 12. The first reinforcing rod 530 is formed to be longer than the width of the discharge electrode 12 so as to protrude from both side ends of the discharge electrode 12. The first reinforcing rod 530 may be joined to the first setting beam 14 by means of a first weld 551.

The first reinforcing rod 530 is formed with a support protrusion 531 protruding upward. The support protrusion 531 is installed to penetrate through the upper end of the first setting beam 14 and may be welded to the first setting beam 14. The support protrusion 531 is joined to the first setting beam 14 by means of a second weld 552.

The first setting beam 14 is formed to extend in the stacking direction of the discharge electrodes 12, and has the plurality of lower slots 143 into which the side ends of the discharge electrodes 12 are inserted. The first reinforcing rod 530 is installed in the first setting beam 14 so that the first reinforcing rod 530 passes through the first setting beam 14 and the lower end of the first reinforcing rod 530 is supported by the first setting beam 14.

The first setting beam 14 may include a lower beam 141 and an upper beam 142 coupled to the lower beam 141. The first weld 551 is where an extension of the first reinforcing rod 530, which extends in the longitudinal direction of the discharge electrode, is welded to the lower beam 141 while the second weld 552 is where the support protrusion 531 is welded to the upper beam 142.

As described above, according to the fifth embodiment, the support protrusion 531 is formed on the first reinforcement rod 530 and the first reinforcing rod 530 is connected to the first setting beam 14 by the first weld 551 and the second weld 552, so that the discharge electrode 12 can be more stably fixed.

While the exemplary embodiments of the present disclosure have been described in the detailed description, the present disclosure is not limited thereto, but should be construed as including all of modifications, equivalents, and substitutions falling within the concepts and scope of the invention defined by the appended claims.

The invention claimed is:

1. An electrostatic precipitating apparatus for a cooling tower including a heat exchanger and a water sprayer spraying cooling water to the heat exchanger, the electrostatic precipitating apparatus comprising:
an electrostatic precipitator including a plurality of discharge electrodes to which a voltage is applied, a plurality of electrostatic precipitating electrodes each disposed between the discharge electrodes and grounded, and a setting beam having a plurality of slots at a downward side of the electrostatic precipitator into which the discharge electrodes are fixedly inserted;
a washing water supply spraying washing water to the electrostatic precipitator; and
a frame assembly supporting the electrostatic precipitator, the frame assembly including a frame extending in a stacking direction of the discharge electrodes to support the setting beam, via which a voltage is applied to the discharge electrodes,
wherein the frame assembly further includes an insulating connector member having a insulator and a terminal rod penetrating through the insulator, wherein the frame is provided to be suspended from the insulating connector member.

2. The electrostatic precipitating apparatus for the cooling tower according to claim 1, wherein the frame assembly further includes a tubular girder into which the insulating connector member is inserted, wherein the insulator is held inside the tubular girder.

3. The electrostatic precipitating apparatus for the cooling tower according to claim 2, wherein a purge air supply pipe is connected to the tubular girder to supply purge air into the tubular girder therethrough, wherein the tubular girder is provided on a downward side thereof with a discharge hole, through which the purge air is discharged.

4. The electrostatic precipitating apparatus for the cooling tower according to claim 1, wherein the insulating connector member is provided on a downward side thereof with a vent hole through which air is jetted downward, wherein the terminal rod extends downward through the vent hole, wherein an anchor is disposed on the terminal rod to support the frame, to which a voltage is applied via the terminal rod.

5. An electrostatic precipitating apparatus for a cooling tower including a heat exchanger and a water sprayer spraying cooling water to the heat exchanger, the electrostatic precipitating apparatus comprising:
an electrostatic precipitator including a plurality of discharge electrodes to which a voltage is applied, a plurality of electrostatic precipitating electrodes each disposed between the discharge electrodes and grounded, and a setting beam having a plurality of slots at a downward side of the electrostatic precipitator into which the discharge electrodes are fixedly inserted,
a washing water supply spraying washing water to the electrostatic precipitator; and
a frame assembly supporting the electrostatic precipitator, the frame assembly including a frame extending in a stacking direction of the discharge electrodes to support the setting beam, via which a voltage is applied to the discharge electrodes,
wherein a reinforcing rod is disposed on the discharge electrode to extend from opposite sides of the discharge electrode in a width direction of the discharge electrode such that the reinforcing rod is supported by the setting beam, wherein the setting beam include a lower beam and an upper beam coupled to the lower beam, wherein the lower beam has a bottom portion and two side walls bent from opposite side ends of the bottom portion and protruding upward, and wherein the lower slots are formed only on the two side walls.

6. The electrostatic precipitating apparatus for the cooling tower according to claim 1, further comprising a prestressing locking member fixed to the inside of a housing of the cooling tower in a state in which a pressing force is applied to the electrostatic precipitator, wherein the prestressing locking member includes a casing, an insulator disposed in the casing, a pressing rod coupled to the insulator to protrude downward, and a pressing support provided to the pressing rod to resiliently support the electrostatic precipitator.

7. An electrostatic precipitating apparatus for a cooling tower including heat exchanger and a water sprayer spraying cooling water to the heat exchanger, the electrostatic precipitating apparatus comprising:
an electrostatic precipitator including a plurality of discharge electrodes to which a voltage is applied, a plurality of electrostatic precipitating electrodes each disposed between the discharge electrodes and grounded, and a first setting beam having a plurality of slots at a downward side of the electrostatic precipitator into which the discharge electrodes are fixedly inserted;
a washing water supply spraying washing water to the electrostatic precipitator; and
a frame assembly supporting the electrostatic precipitator, the frame assembly including a frame extending in a stacking direction of the discharge electrodes to support the first setting beam, via which a voltage is applied to the discharge electrodes,
wherein a downward surface of the electrostatic precipitating electrode is provided with a lowest portion disposed below other portions of the electrostatic precipitating electrode so that the washing water is collected at the lowest portion, wherein a discharge guide having a channel is disposed directly below the lowest portion so that the washing water flowing down from the electrostatic precipitating electrode is accommodated in the channel.

8. The electrostatic precipitating apparatus for the cooling tower according to claim 7, wherein the discharge guide extends in the stacking direction of the electrostatic precipitating electrodes.

9. The electrostatic precipitating apparatus for the cooling tower according to claim 8, wherein a downward part of the electrostatic precipitating electrode is provided with a fixing hole, through which a fixing rod is inserted, wherein a support hanger is coupled to the fixing rod to support the discharge guide, wherein the support hanger includes a plurality of connection protrusions protruding upward and into which the downward part of the electrostatic precipitating electrode is inserted, wherein the connection protrusion is provided with a support hole into which the fixing rod is inserted.

10. The electrostatic precipitating apparatus for the cooling tower according to claim 1, wherein the electrostatic precipitator and the heat exchanger are arranged such that the electrostatic precipitator and the heat exchanger do not overlap in the vertical direction.

11. The electrostatic precipitating apparatus for the cooling tower according to claim 10, wherein the electrostatic precipitator is located at the center of a housing of the cooling tower in a width direction and the heat exchanger and the water sprayer are located in the housing on a lateral side of the electrostatic precipitator in the width direction.

12. The electrostatic precipitating apparatus for the cooling tower according to claim 5, wherein the electrostatic precipitator and the heat exchanger are arranged such that the electrostatic precipitator and the heat exchanger do not overlap in the vertical direction.

13. The electrostatic precipitating apparatus for the cooling tower according to claim 12, wherein the electrostatic precipitator is located at the center of a housing of the cooling tower in a width direction the heat exchanger and the water sprayer are located in the housing on a lateral side of the electrostatic precipitator in the width direction.

14. The electrostatic precipitating apparatus for the cooling tower according to claim 7, wherein the electrostatic precipitator and the heat exchanger are arranged such that the electrostatic precipitator and the heat exchanger do not overlap in the vertical direction.

15. The electrostatic precipitating apparatus for the cooling tower according to claim 14, wherein the electrostatic precipitator is located at the center of a housing of the cooling tower in a width direction and the heat exchanger and the water sprayer are located in the housing on a lateral side of the electrostatic precipitator in the width direction.

* * * * *